Inventor
T. S. BRIGGS
By Cameron Kerkam & Sutton
Attorneys

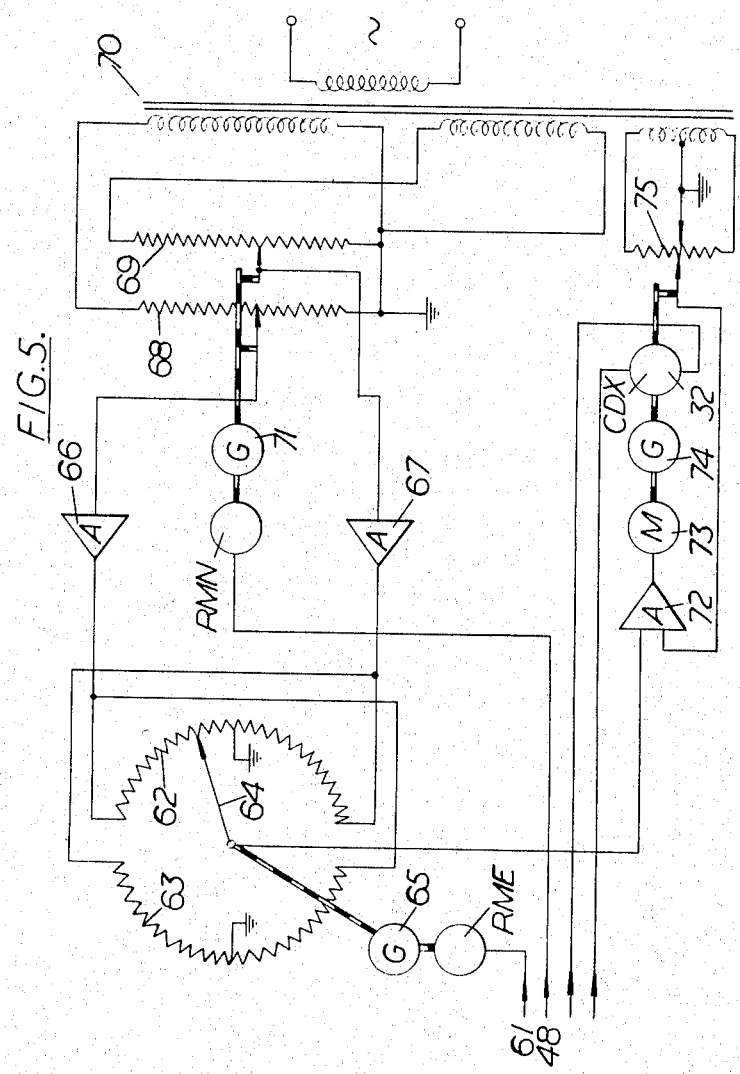

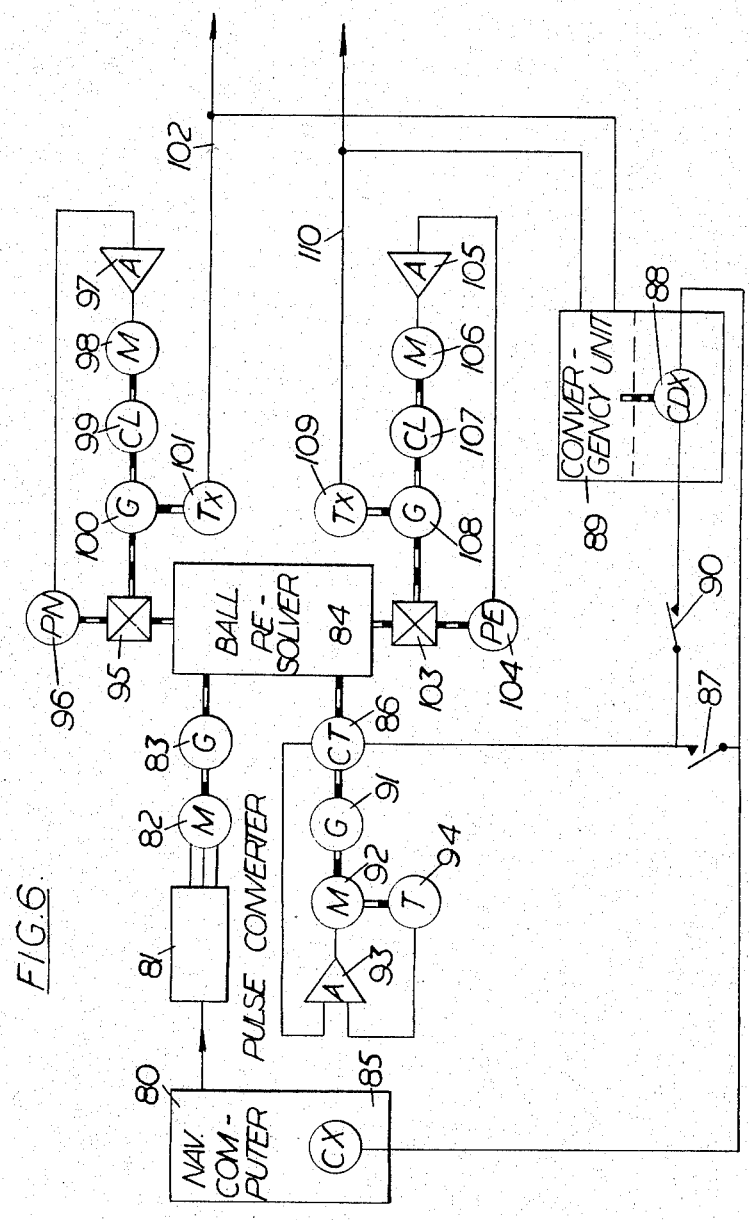

Dec. 19, 1967   T. S. BRIGGS   3,359,408
NAVIGATIONAL DISPLAY DEVICES FOR USE ON MOVING VEHICLES
Filed April 14, 1964   6 Sheets-Sheet 6
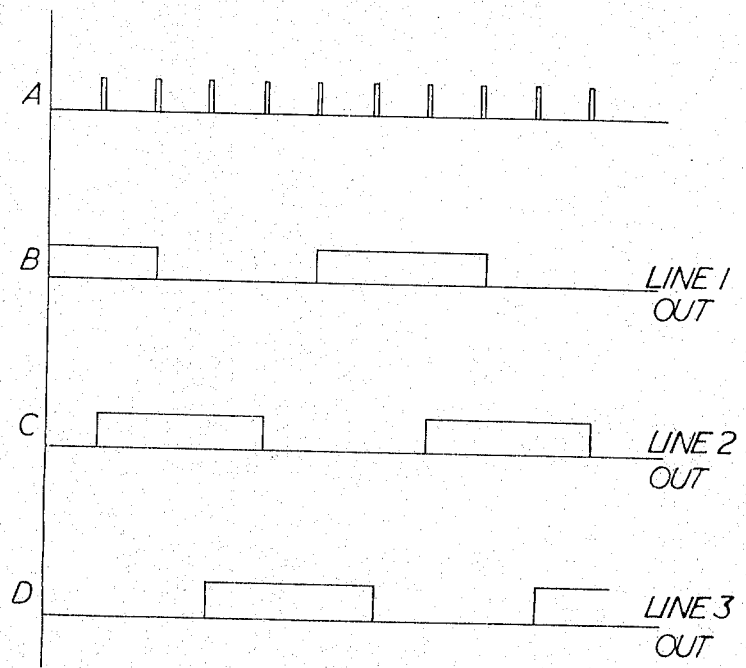
*Inventor*
T. S. BRIGGS
By
Cameron, Kerkam & Sutton
*Attorneys*

United States Patent Office 3,359,408
Patented Dec. 19, 1967

3,359,408
NAVIGATIONAL DISPLAY DEVICES FOR USE ON MOVING VEHICLES
Thomas Stanley Briggs, Edinburgh, Scotland, assignor to Ferranti, Limited, Hollinwood, England, a company of Great Britain and Northern Ireland
Filed Apr. 14, 1964, Ser. No. 359,618
Claims priority, application Great Britain, Apr. 18, 1963, 15,225/63
9 Claims. (Cl. 235—150.27)

ABSTRACT OF THE DISCLOSURE

A navigational display device for use on a moving vehicle projects an image of a conical projection map onto a viewing screen provided with a fixed fiducial mark indicating the present position of the vehicle, and moves the image relative to said mark in response to signals, from a navigational computer which resolves the vehicle movements into coordinate directions parallel to and perpendicular to a given map meridian. Means are provided for determining the convergence angle of the map meridian of the present position of the vehicle with respect to the given map meridian, and the vehicle movements are resolved by the computer through the algebraic sum of the vehicle track angle and the convergence angle.

Figure 1:
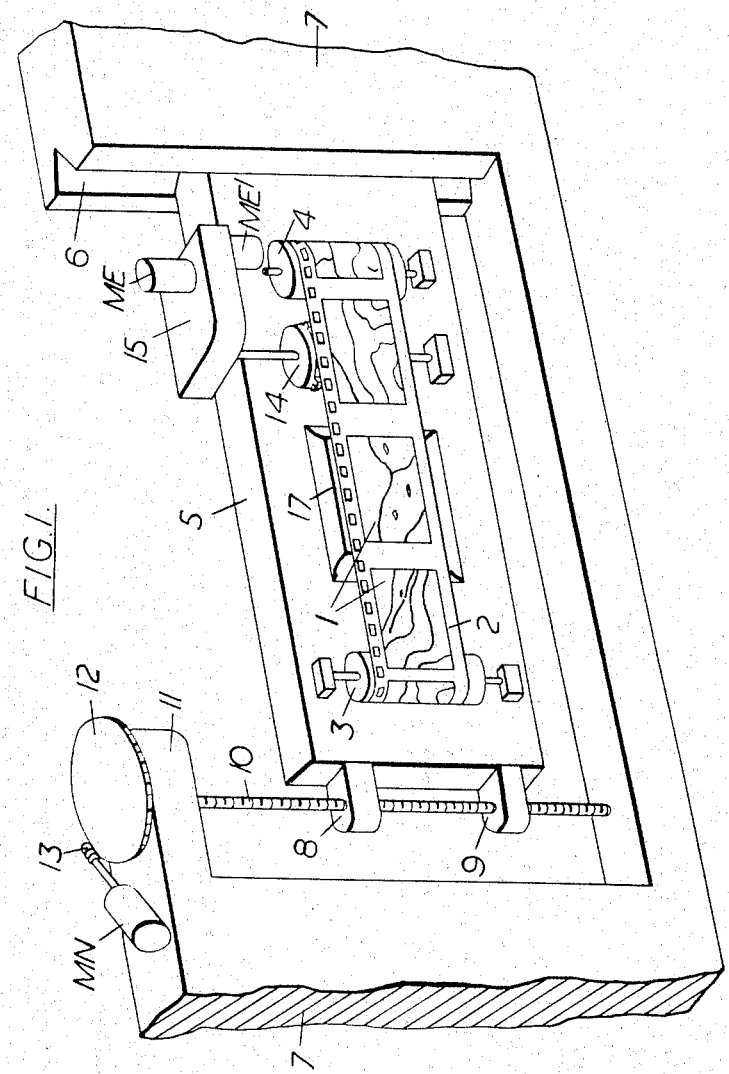

This invention relates to navigational display devices for use on moving vehicles.

Navigational display devices are known in which a map, usually in the form of a micro-transparency, is mounted on a carriage so as to be movable in two mutually perpendicular directions in accordance with the northerly and easterly components of the velocity of the vehicle obtained by resolving the velocity of the vehicle through the track angle. An image of a portion of the map is projected onto a viewing screen and the drive of the map is such that the present position of the vehicle is indicated by a fixed fiducial mark on the viewing screen. When the vehicle, such as an aircraft, is required to move over a large area a series of maps are arranged in sequence along a length of film, adjacent maps in the sequence having an area of overlap such that when the present position of the vehicle approaches one edge of a map the next map in the sequence may be brought into use and aligned with the fiducial mark indicating the known present position of the vehicle.

For navigational purposes it is often desirable to use maps based on a conical projection in which the meridians converge to a point off the map and in which the parallels of latitude are arcs of circles. When it is required to use a sequence of such maps in a navigational display device of the above kind it is usual to arrange the maps such that a given meridian, usually the central meridian, on each map is parallel to one of the directions of movement of the map, any other meridian on the map converging with the given meridian at an angle hereinafter referred to as the convergence angle of the meridian. Due to the convergence of the meridians and the arcuate representation of the parallels of latitude the use of a drive system for the map in which the velocity is simply resolved through the track angle of the vehicle, as in the known devices, results in the possibility of a serious error arising between the actual and the indicated present position of the vehicle.

It is an object of the present invention to provide a navigational display device for use on a moving vehicle in which maps based on a conical projection may be used without introducing a serious error.

According to the present invention a navigational display device for use on a moving vehicle adapted for use with maps based on a conical projection includes means for projecting an image of part of a map onto a viewing screen, driving means for moving said image in two mutually perpendicular directions, each map in use being arranged such that a given meridian, when projected onto said screen, is parallel to one of said two mutually perpendicular directions, means for determining the movements of said vehicle, means for determining the track angle of said vehicle, means for determining the convergence angle of the meridian of the present position of the vehicle, means for resolving said movements through the algebraic sum of said track angle and said convergence angle to determine the components of said movements parallel to and perpendicular to said given meridian, and means for actuating said driving means for moving said image in directions parallel to and perpendicular to said given meridian in accordance with said resolved components of said movements.

Said means for determining the convergence angle of the meridian of the present position of the vehicle may comprise means for determining the distance of the present position of the vehicle from said given meridian, means for determining the tangent of the latitude of the present position of the vehicle, and means for determining the product of said distance and said tangent.

As used herein, the expression "movements" when applied to a vehicle includes the velocity of the vehicle and small increments of travel of the vehicle.

Figure 2:
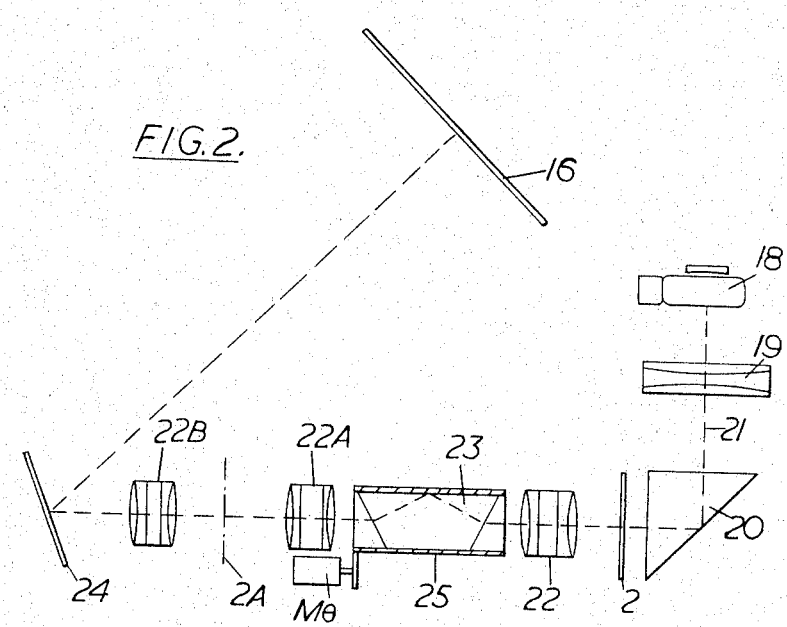
Figure 3:
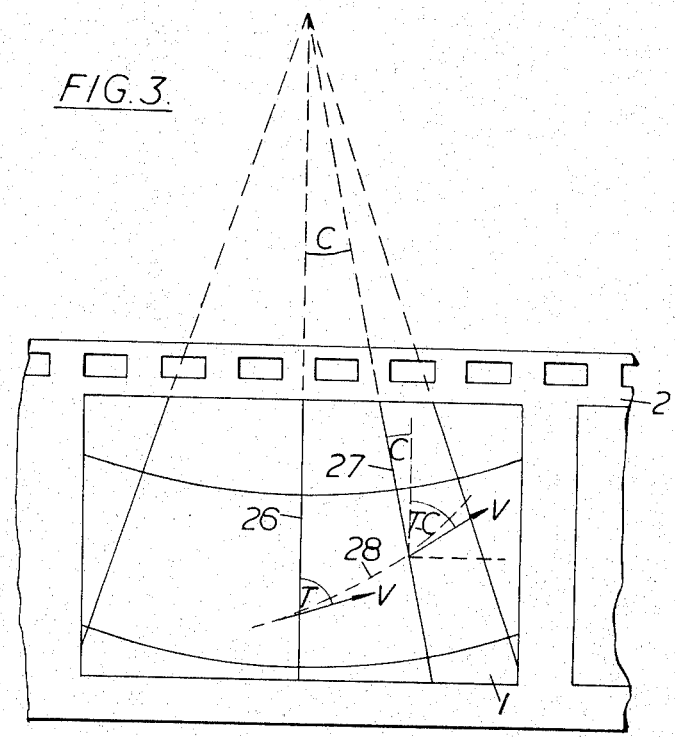
Figure 4:
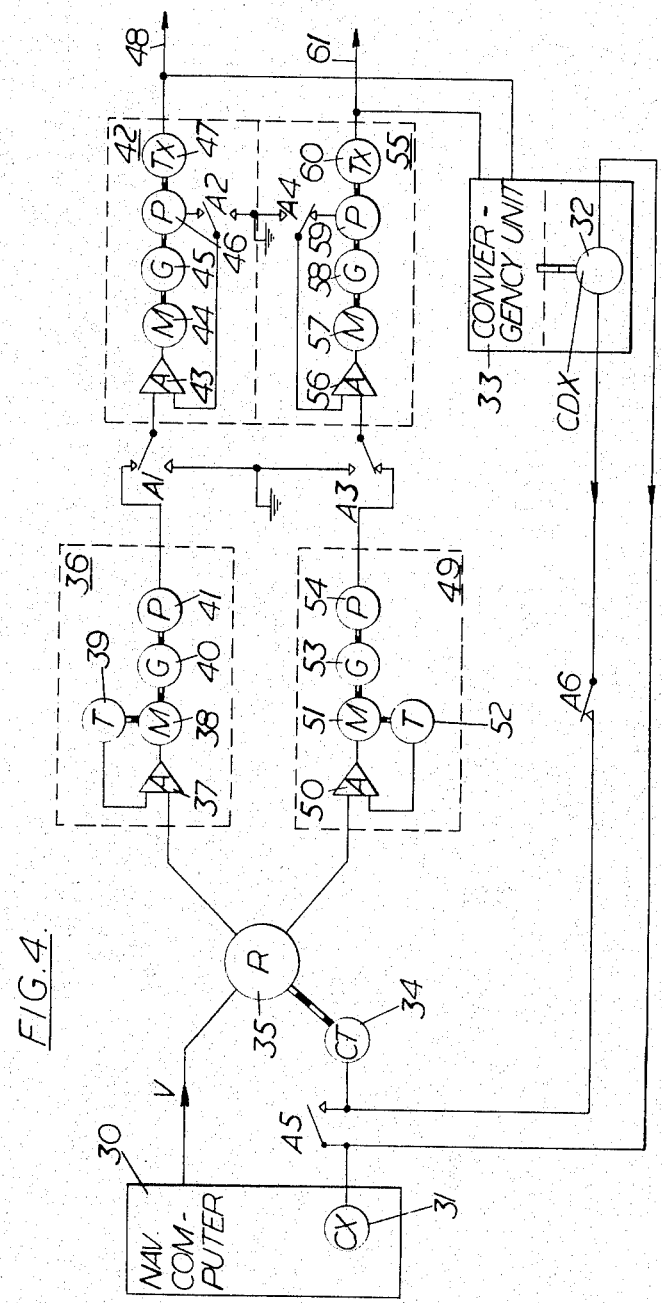

The present invention will now be described by way of example with reference to the accompanying drawings in which:

FIGURE 1 is a perspective view of the map carriage and associated drive of a navigational display device in accordance with the invention, FIGURE 2 is a schematic drawing showing the optical system of the device, FIGURE 3 is a schematic drawing showing a map based on a conical projection, FIGURE 4 is a schematic diagram of part of the control circuit of the device, FIGURE 5 is a schematic diagram of a further part of the control circuit of the device, FIGURE 6 is a schematic diagram of a further form of control circuit for the device, and FIGURE 7 is a waveform illustrating the operation of a part of the control circuit of FIGURE 6.

Referring now to FIGURE 1 of the drawings the navigational display device includes a sequence of maps 1 in the form of coloured micro-transparencies on a film 2 carried on rollers 3 and 4. The rollers 3 and 4 are mounted on a carriage 5, one end of which is V shaped and is movable in a corresponding V shaped groove 6 in part of a rigid support structure 7. The other end of the carriage 5 has two lugs 8 and 9 each having a threaded aperture through which passes a threaded rod 10. The rod 10 is rotatably supported at its bottom end on the support structure 7 and at its top end passes through an aperture in a lug 11 on the support structure 7. A pinion 12 is secured to the top end of the rod 11 and may be rotated by a stepping motor MN having a worm wheel 13 on its output shaft meshing with the pinion 12. The carriage 5 may thus be moved up and down the rod 10 in a direction parallel to the sides of the maps 1. The motor MN is controlled by a stepping transmitter which is actuated in accordance with the movements of the craft as determined by a navigational computer to be described later.

The maps 1 may be moved in a direction perpendicular to the sides of the maps by means of a stepping motor ME which drives a sprocket roller 14 through a differential gear 15 mounted on the carriage 5. The motor ME also drives the rollers 3 and 4 through friction gearing (not shown) to maintain the film 2 in tension in known manner. The motor ME is controlled by a stepping transmitter which is actuated in accordance with the movements of the craft as determined by the navigational computer.

A further motor $ME^1$ is provided to drive the film at high speed to enable rapid selection of the desired map on the film. The desired map is projected optically onto a viewing screen 16 (FIGURE 2) provided with a fixed fiducial point (not shown) by means shown schematically in FIGURE 2, and to enable this the carriage 5 is provided with a window 17.

The optical projection system is shown schematically in FIGURE 2 and includes a projection lamp 18, a condenser lens 19 and a prism 20 for causing a fold in the optical axis 21 of the system. The film 2 is placed in the focal plane of a collimator lens 22 the parallel rays from which pass through a Dove prism 23 and are formed into a primary image 2A by a first projection lens 22A. A second projection lens 22B projects an image of the primary image 2A via a plane mirror 24 onto the viewing screen 16.

The Dove prism 23 is mounted within a drum 25 which may be rotated about the optical axis by means of a stepping motor $M\theta$, thus rotating the image of the map 1 projected onto the viewing screen 16, the image being rotated through twice the angle of rotation of the drum. The motor $M\theta$ is controlled by a stepping transmitter which is actuated in accordance with the changes of trackangle of the craft as determined by the navigational computer.

The maps 1 on the film 2 are based on a conical projection as shown schematically for a map in the Northern Hemisphere in FIGURE 3. The central meridian 26 on each of the maps 1 is parallel to the sides of the map i.e. is parallel to one of the directions of movement of the map, and all other meridians on the map, such as the meridian 27, converge with the central meridian at a point off and to the north of the map with individual convergence angles such as the convergence angle C for the meridian 27. For maps in the Southern Hemisphere the meridians converge to the south of the map and for the purposes of this specification meridians to the east of the central meridian are considered to have a negative convergence angle for maps in the Northern Hemisphere and a positive convergence angle for maps in the Southern Hemisphere and meridians to the west of the central meridian are considered to have a positive convergence angle for maps in the Northern Hemisphere and a negative convergence angle for maps in the Southern Hemisphere.

From FIGURE 3 it will be seen that the path of a vehicle, such as an aircraft, moving on a course with a constant track angle T is represented on the map 1 by a curved path 28 which crosses each of the meridians at an angle T. When the path crosses the central meridian 26 the components of the velocity parallel to and perpendicular to the central meridian are $V \cos T$ and $V \sin T$ respectively, i.e. the same as the north-south and east-west components of the velocity. When the path crosses the meridian 27 the north-south and east-west components of the velocity remain $V \cos T$ and $V \sin T$ as before. In accordance with the present invention, however, the velocity is resolved through the algebraic sum of the track angle and the convergence angle and the map is driven parallel to and perpendicular to the central meridian in accordance with the resultant components of the velocity. Therefore, when the path crosses the meridian 27 the components of the velocity become $V \cos (T-C)$ and $V \sin (T-C)$ which are respectively the correct components of the velocity parallel to and perpendicular to the central meridian.

A circuit for controlling the drives to the map is shown in FIGURE 4. The device includes a navigational computer 30 of known kind which produces an electrical output representing the ground velocity V of the vehicle and which includes a compass or other device together with a synchro transmitter 31 for producing an electrical output representing the track angle T of the vehicle with respect to north. The track angle output from the synchro transmitter 31 is applied either via normally open relay contacts A5 or via a synchro differential transformer 32 in a convergency unit 33 and normally closed relay contacts A6 to a synchro receiver 34, the rotor of which is mechanically coupled to the rotor of a resolver 35. The rotor of the synchro differential transformer 32 is mechanically driven by the convergency unit 33, in a manner to be described later, such that the angular position of the rotor corresponds to the convergence angle C of the meridian of the present position of the vehicle. Therefore, when the contacts A5 are open and the contacts A6 are closed, as shown in FIGURE 4, the rotor of the synchro receiver 34, and thereby the rotor of the resolver 35, is driven to an angular position corresponding to the algebraic sum of the track angle T and the convergence angle C.

One output of the resolver 35 is connected to the input of an integrator 36 comprising an amplifier 37, the output of which controls a motor 38. The motor 38 is coupled to a tachometer generator 39 and, through a gearbox 40, to a potentiometer 41 of the multi-turn type. The output of the tachometer generator 39 is applied as a negative feedback to the amplifier 37 and the output from the potentiometer 41 is connected to the normally closed contact of relay contacts A1, the normally open contact being connected to earth. The moving contact of the contacts A1 is connected to a follow-up unit 42 comprising an amplifier 43, the output of which controls a motor 44. The motor 44 is coupled through a gearbox 45 to a potentiometer 46 of the multi-turn type and a stepping transmitter 47, the output of which is applied over the lead 48 to the motor MN (FIGURE 1). The output of the potentiometer 46 is applied as a comparison voltage to the amplifier 43 via the normally closed contact of relay contacts A2, the normally open contact being connected to earth.

Similarly, the other output of the resolver 35 is connected to the input of an integrator 49 comprising an amplifier 50, the output of which controls a motor 51. The motor 51 is coupled to a tachometer generator 52 and, through a gearbox 53, to a potentiometer 54 of the multi-turn type. The output of the tachometer generator is applied as a negative feedback to the amplifier 50 and the output from the potentiometer 54 is connected to the normally closed contact of relay contacts A3, the normally open contact being connected to earth. The moving contact of the contacts A3 is connected to a follow-up unit 55 comprising an amplifier 56, the output of which controls a motor 57. The motor 57 is coupled through a gearbox 58 to a potentiometer 59 of the multiturn type and a stepping transmitter 60, the output of which is applied over the lead 61 to the motor ME (FIGURE 1). The output of the potentiometer 59 is applied as a comparison voltage to the amplifier 56 via the normally closed contact of relay contacts A4, the normally open contact being connected to earth.

The leads 48 and 61 are also connected to the convergency unit 33 which is shown in detail in FIGURE 5. The convergence angle C is proportional to the value $s \cdot \tan \phi$ where $s$ is the distance of the present position of the vehicle east or west of the central meridian and $\phi$ is the latitude of the present position. To determine the value $s \cdot \tan \phi$ the convergency unit includes two like centre-tapped linearly wound potentiometers 62, 63 having their centre-taps connected to earth. The potentiometers 62, 63 extend around a circle with a small gap between adjacent ends and a single wiper 64 is provided for engaging one or other of the potentiometers. The wiper 64 is driven through a gearbox 65 by a repeater motor RME which is connected via the line 61 to the stepping transmitter 60 (FIGURE 4). The repeater motor RME is therefore driven in synchronism with the motor ME and the ratio of the gearbox 65 is such that the wiper 64 is driven from end to end of one or other of the potentiometers 62, 63 in synchronism with the relative movement of the fiducial mark between the eastern and western boundary of any one of the maps 1. The potentiometers 62, 63 are initially set by turning the casing such that the wiper 64 is at the centre of one or other of the potentiometers when the fiducial mark is on the central meridian of the map. Thereafter, the angular position of the wiper 64 is proportional to the distance ($s$) of the vehicle from the central meridian.

The ends of the potentiometers 62, 63 are cross connected and connected via buffer amplifiers 66, 67 to the wipers of two ganged potentiometers 68, 69 having resistance elements wound to a tangent law. The potentiometers 68, 69 are energised from an A.C. source through separate secondary windings on a transformer 70 such that equal voltages of opposite polarities appear across the potentiometers 68, 69, and the wipers are driven through a gearbox 71 by a repeater motor RMN which is connected via the line 48 to the stepping transmitter 47 (FIGURE 4). The repeater motor RMN is therefore driven in synchronism with the motor MN and the ratio of the gearbox 71 is such that the range of movement of the wipers of the potentiometers 68, 69 is sufficient to cover the desired north-south range of movement of the vehicle. Initially, the wipers of the potentiometers 68, 69 are set to a position corresponding to the latitude $\phi$ of the present position of the vehicle and thereafter the potentials applied to the potentiometers 62, 63 are closely proportional to tan $\phi$ since the distance travelled in the north-south direction is approximately proportional to the change in latitude. The output from the wiper 64 is therefore proportional to $s$. tan $\phi$ or the convergence angle C. The wiper 64 is connected to one input of an amplifier 72, the output of which controls a motor 73. The motor 73 is coupled through a gearbox 74 to the rotor of the synchro differential transformer 32 and the wiper of a potentiometer 75 having a centre-tap connected to earth. The potentiometer 75 is energised from a winding on the transformer 70 having a centre-tap connected to earth and the output from the wiper of the potentiometer 75 is applied as a comparison voltage to the amplifier 72. In this manner the rotor of the synchro differential transformer 32 is driven to a position corresponding to the convergence angle C of the present position of the vehicle.

Referring again to FIGURE 4, during normal operation the relay contacts A1 . . . A6 are in the position shown and the velocity V is therefore resolved into the components parallel to and perpendicular to the central meridian of the map 1 in use. The output of the resolver 35 representing the component of velocity parallel to the central meridian is applied to the integrator 36 and the output of the potentiometer 41 therefore represents the distance travelled in a direction parallel to the central meridian. The inputs to the follow-up amplifier 43 are such as to cause the motor 44 to be operated to maintain the output from the potentiometer 46 equal to the output from the potentiometer 41 and thereby cause the appropriate movements of the map 1 in a direction parallel to the central meridian via the stepping transmitter 47 and motor MN. Similarly the output of the resolver 35 representing the component of velocity perpendicular to the central meridian is applied to the integrator 49 and appropriate movements of the map 1 in a direction perpendicular to the central meridian are effected by the stepping transmitter 60 and the motor ME.

When the present position of the vehicle approaches an edge of the map 1 the relay A (not shown) which controls relay contacts A1 . . . A6 is energised and the next map required is selected. Assuming that the next map required is the next map in the sequence it is selected by manually controlling the motors ME and MN through means (not shown), any movements of these motors being repeated by the motors RMN and RME in the convergency unit 33. Since the features in the marginal area of one map are repeated in the marginal area of the next map, the next map is adjusted by controlling the motors MN and ME to bring beneath the fiducial point the same feature of the map as was beneath the fiducial point when the relay A was energised, the relay A then being de-energised. During the time for which the relay A is energised the contacts A1 . . . A6 are in the opposite position to that shown in FIGURE 4. The velocity is therefore resolved into its northerly and easterly components which are applied to the integrators 36 and 49 respectively. The motors 38 and 51 continue to operate and the movements of the vehicle are stored by the potentiometers 41 and 54. The inputs to the amplifiers 43 and 56, however, are earthed and the motors 44 and 57 remain stationary. When the relay A is de-energised the contacts A1 . . . A6 revert to the position shown. The motors 44 and 57 then become operative to remove the difference between the outputs from potentiometers 46 and 41 and from potentiometers 59 and 54 respectively, the movements of the vehicle during the time taken to change the maps thus being applied to the new map.

As the motor ME is operated to drive from one map to the next the wiper 64 is moved from the potentiometer 62 to the potentiometer 63, or vice versa, the spacing between the ends of the potentiometers 62 and 63 corresponding to the distance between adjacent maps in the sequence. Therefore, when the relay A is de-energised the rotor of the synchro differential transformer 32 in the convergency unit 33 is rotated to correspond to the convergence angle C of the present position on the new map.

If the next map required is not the next map in the sequence, as may be the case when crossing the northern or southern edge of the map, the motor ME' is operated to select the next required map, the wiper 64 in the convergency unit being rotated once as the film 2 is moved over the length of two maps. When the map has been selected it is aligned with the fiducial point above the last known position of the vehicle in the manner previously described and the relay A de-energised. Thereafter the velocity is resolved through the algebraic sum of the track angle and the new convergence angle on the selected map.

If it is required to rotate the image of the map by means of the Dove prism 23 (FIGURE 2) such that the heading of the vehicle always appears to be in a given direction, the output from the synchro receiver 34 (FIGURE 4) may be used to control the motor MΘ FIGURE 2) such that the Dove prism 23 is rotated through an angle which is corrected for the convergence angle of the present position of the vehicle.

The navigational display device described above makes use of the resolved components of velocity to determine the movements of the vehicle and thus the movements to be applied to the map. In some navigational systems, however, use is made of small increments of travel of the vehicle rather than velocity to determine the movements of the vehicle and FIGURE 6 shows a schematic diagram of a control circuit for moving the map suitable for use with such a system. The circuit shown in FIGURE 6 derives control information from a navigational computer 80 including means, such as a Doppler radar, for yielding an output train of pulses in which each pulse represents an increment of travel of the vehicle. In a typical system each pulse represents the end of an increment of travel of approximately thirty feet moved by the vehicle. The train of pulses from the computer 80 is applied to a pulse converter 81 which has three output lines connected to the three stator windings of a stepping motor 82. The pulse converter 81 is an electronic switching circuit which converts the single train of input pulses to output pulses on the three output lines such that the stator windings of the stepping motor are energised in the sequence, one, one and two, two, two and three, three, three and one, one step of the sequence being made in response to each input pulse so that the rotor of the motor 81 advances through 60° at each pulse. This is shown in FIGURE 7 in which line A shows the input train of pulses applied to the pulse converter 81 and lines B, C and D show the output pulses on the three output lines. The motor 82 is coupled through a gearbox 83 to one input of a mechanical ball resolver 84.

The computer 80 also includes a compass or other device together with a synchro transmitter 85 for producing an electrical output representing the track angle T of the vehicle with respect to north. The north angle output from the synchro transmitter 85 is applied to a synchro transformer 86 either directly via a switch 87 or via a synchro differential transformer 88 in a convergency unit 89 and a switch 90. The convergency unit 89 operates in a manner similar to that described with reference to FIGURE 5 to drive the rotor of the synchro differential transformer 88 such that the angular position of the rotor corresponds to the convergence angle C of the meridian of the present position of the vehicle. The rotor of the synchro transformer 86 is coupled to the second input of the ball resolver 84 and is driven through a gear box 91 by a motor 92 controlled by the ouput from an amplifier 93. The motor 92 also drives a tachometer generator 94, the output of which is applied as a negative feedback to one input of the amplifier 93. The output from the rotor of the synchro transformer 86 is applied to the other input of the amplifier 93.

One output of the ball resolver 84 is coupled to one input of a differential gear 95 the output of which drives the rotor of a potentiometer 96. The output of the potentiometer 96 is applied to the input of an amplifier 97 the output of which controls a motor 98. The motor 98 is coupled through an electromagnetically operated clutch 99 and a gearbox 100 to the second input of the differential gear 95 and also through the gearbox 100 to a stepping transmitter 101, the output of which is applied over the lead 102 to the convergency unit 89 and to the motor MN (FIGURE 1).

Similarly, the other output of the ball resolver is coupled to one input of a differential gear 103 the output of which drives the rotor of a potentiometer 104. The output of the potentiometer 104 is applied to the input of an amplifier 105 the output of which controls a motor 106. The motor 106 is coupled through an electromagnetically operated clutch 107 and a gearbox 108 to the second input of the differential gear 103 and also through the gearbox 108 to a stepping transmitter 109 the output of which is applied over the lead 110 to the convergency unit 89 and to the motor ME (FIGURE 1).

In operation, with the switch 87 open and the switch 90 closed as shown the signal applied to the stator of the synchro control transformer 86 represents the algebraic sum of the track angle and the convergence angle of the meridian of the present position of the vehicle. The amplifier 93 controls the motor 92 such that the output from the rotor of the synchro control transformer 86 is zero and the shaft input to the ball resolver 84 therefore also represents the algebraic sum of the track angle and the convergence angle. The increments of travel represented by the shaft rotations of the other input to the ball resolver 54 are therefore resolved into components parallel to and perpendicular to the central meridian of the map 1 in use. The output representing the component parallel to the central meridian is applied through the differential gear 95 to drive the potentiometer 96 from a central zero position. The resultant output from the potentiometer 96 causes operation of the motor 98 in a direction such as to return the potentiometer 96 to its zero position through the differential gear 95, the operation of the motor 98 controlling the operation of the motor MN (FIGURE 1) via the stepping transmitter 101 to move the map carriage in a direction parallel to the central meridian.

Similarly, the output representing the component of the increments of travel perpendicular to the central meridian is applied through the differential gear 103 to drive the potentiometer 104 from a central zero position. The resultant output from the potentiometer 104 causes operation of the motor 106 in a direction such as to return the potentiometer 104 to its zero position through the differential gear 103, the operation of the motor 106 controlling the operation of the motor ME (FIGURE 1) via the stepping transmitter 109 to move the map carriage in a direction perpendicular to the central meridian.

When it is desired to change maps the switch 87 is closed and the switch 90 opened, and the clutches 99 and 107 are energised to decouple the motors 98 and 106 from the differential gears 95 and 104 and from the stepping transmitter 101 and 109. The required map is then selected and manually adjusted until the fiducial mark is on the last known position of the vehicle as described in the previous example. During the time taken to select the required map the increments of travel are resolved into northerly and easterly components since the synchro transformer 86 is connected directly to the track angle synchro transmitter 85. The northerly components are applied to the potentiometer 96 which, since the motor 98 is decoupled from the differential gear 95, is not returned to its zero position and therefore stores the northerly component of travel. The easterly components of the increments of travel are similarly stored by the potentiometer 104. When the required map has been selected the switch 87 is opened and the switch 90 closed, and the clutches 99 and 107 de-energised. The motors 98 and 106 then operate to return the potentiometers 96 and 104 to their zero position, the stored components of the increments of travel being applied to the motors MN and ME (FIGURE 1) via the stepping transmitters 101 and 109.

The navigational display devices described above may be modified in many ways. In the convergency unit, for example, a single centre-tapped potentiometer may be used instead of the two potentiometers 62, 63, the drive to the wiper 64 being such that it is rotated through 360° when the film 2 (FIGURE 1) is moved from one edge on one map to the corresponding edge on the next map. Also, a single potentiometer wound to a tangent law may be used in place of the potentiometers 68, 69, the potentiometers 62, 63 being energised through a suitable push pull amplifier.

The navigational display devices described above have been for use with maps in the Northern Hemisphere. For use with maps in the Southern Hemisphere in which the algebraic signs of the convergence angles are reversed the devices may be simply modified either by reversing the phasing, i.e. polarities, of the voltage applied to the tangent potentiometers 68, 69 or by reversing the phasing of the voltage applied to the reference potentiometer 75. If it is desired to use the devices with maps in both the Northern and Southern Hemispheres the tangent potentiometers 68, 69 may be replaced by centre-tapped tangent wound potentiometers having the centre taps earthed instead of two ends.

What I claim is:

1. A navigational display device for use on a moving vehicle including a viewing screen having a fiducial point for indicating the present position of the vehicle, means for projecting an image of part of a conical projection map onto said viewing screen, driving means for moving said image in two mutually perpendicular directions relative to the fiducial point, said image being so projected onto said screen that a given meridian of the map image is parallel to one of said two mutually perpendicular directions, means for determining the movements of said vehicle, means for determining the track angle of said vehicle, means for determining the convergence angle of the meridian of the present position of the vehicle relative to said given meridian, means for resolving said vehicle movements through the algebraic sum of said track angle and said convergence angle to determine the components of said movements parallel to and perpendicular to said given meridian, and means for actuating said driving means for moving said image in directions parallel to and perpendicular to said given meridian in accordance with said resolved components of said movements.

2. A navigational display device as claimed in claim 1 in which said means for determining the movements of said vehicle comprise means for determining the velocity of said vehicle.

3. A navigational display device as claimed in claim 1 in which said means for determining the movements of said vehicle comprise means for determining small increments of travel of said vehicle.

4. A navigational display device as claimed in claim 1 in which said means for determining the convergence angle of the meridian of the present position of the vehicle comprises means for determining the distance of the present position of the vehicle from said given meridian, means for determining the tangent of the latitude of the present position of the vehicle, and means for determining the product of said distance and said tangent.

5. A navigational display device as claimed in claim 4, in which said means for determining the distance of the present position of the vehicle from said given meridian includes a linearly wound potentiometer, and means for driving the wiper of said potentiometer from one end to the other end of said potentiometer in synchronism with the relative movement of the fiducial point between the eastern and western boundaries of said map, the point at which said wiper contacts the resistance track of said potentiometer when said fiducial point is on said given meridian being connected to a reference potential.

6. A navigational display device as claimed in claim 5 in which said reference potential is earth potential.

7. A navigational display device as claimed in claim 4 in which said means for determining the tangent of the latitude of the present position of the vehicle includes a potentiometer having a resistance element wound to a tangent law, and means for driving the wiper of said potentiometer in accordance with the north-south movements of said vehicle.

8. A navigational display device for use on a moving vehicle including a viewing screen having a fiducial point for indicating the present position of the vehicle, means for projecting an image of part of one of a sequence of conical projection map transparencies onto said viewing screen, said sequence of map transparencies being in the form of a length of film, driving means for moving said one map in two mutually perpendicular directions, said image being so projected that the central meridian of the map image is parallel to one of said two mutually perpendicular directions, means for determining the movements and track angle of said vehicle, convergency means for determining the convergence angle of the meridian of the present position of the vehicle relative to said central meridian comprising two like potentiometers having resistance tracks wound to a tangent law and having their wipers mechanically ganged together, means for energising said two tangent law potentiometers with equal voltages of opposite polarities, means for driving the wipers of said tangent law potentiometers in accordance with the north-south movements of said vehicle, two like linearly wound centre-tapped potentiometer tracks extending around a circle with a small gap between adjacent ends, the centre-taps of said potentiometer tracks being connected to earth potential and the two ends of one of said tracks being electrically connected to the diametrically opposite ends of the other of said tracks and to the two wipers of said tangent law potentiometers, a single wiper for engaging one or other of said linearly wound potentiometer tracks and means for so driving said single wiper that it travels from end to end of one or other of said potentiometers in synchronism with the relative movement of the fiducial point between the eastern and western boundaries of any one of said sequence of maps, the gaps between the ends of said potentiometer tracks being equivalent to the gaps between adjacent ones of said sequence of maps on said film, means for resolving said vehicle movements through the algebraic sum of said track angle and said convergence angle to determine the components of said movements parallel to and perpendicular to said central meridian, and means for actuating said driving means for moving said one map in directions parallel to and perpendicular to said central meridian in accordance with said resolved components of said movements.

9. A convergency unit for determining the convergence angle of the meridian of the present position of a moving vehicle with respect to a given meridian of a map based on a conical projection comprising means for determining the distance of the present position of the vehicle from said given meridian, means for determining the tangent of the latitude of the present position of the vehicle, and means for determining the product of said distance and said tangent.

References Cited

UNITED STATES PATENTS

| | | | |
|---|---|---|---|
| 2,163,746 | 6/1939 | Courtois-Suffit et al. | 35—10.2 X |
| 2,540,150 | 2/1951 | Watts, Jr. | 235—150.27 X |
| 3,026,038 | 3/1962 | Ederer | 35—10.2 X |
| 3,080,117 | 3/1963 | Wright et al. | 35—10.2 X |
| 3,134,295 | 5/1964 | Brown et al. | 35—10.2 X |

MALCOLM A. MORRISON, *Primary Examiner.*

J. RUGGIERO, *Assistant Examiner.*